US008384653B2

(12) United States Patent
Kim et al.

(10) Patent No.: US 8,384,653 B2
(45) Date of Patent: Feb. 26, 2013

(54) SYSTEM AND METHOD FOR ENHANCING SATURATION OF RGBW IMAGE SIGNAL

(75) Inventors: Yun-Tae Kim, Suwon-si (KR); Du-Sik Park, Suwon-si (KR); Ju Yong Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 760 days.

(21) Appl. No.: 12/029,016

(22) Filed: Feb. 11, 2008

(65) Prior Publication Data

US 2009/0059078 A1 Mar. 5, 2009

(30) Foreign Application Priority Data

Aug. 27, 2007 (KR) ........................ 10-2007-0086231

(51) Int. Cl.
*G09G 3/30* (2006.01)
*G09G 3/36* (2006.01)
*G09G 5/10* (2006.01)
*G06K 9/00* (2006.01)

(52) U.S. Cl. ............ 345/102; 345/77; 345/88; 345/690; 382/162; 382/167

(58) Field of Classification Search .................... 345/77, 345/83, 88, 102, 690; 382/162–172
See application file for complete search history.

(56) References Cited

U.S. PATENT DOCUMENTS

| | | | | |
|---|---|---|---|---|
| 5,333,243 | A * | 7/1994 | Best et al. | 345/690 |
| 5,929,843 | A * | 7/1999 | Tanioka | 348/690 |
| 7,613,338 | B2 * | 11/2009 | Yano | 382/162 |
| 7,656,375 | B2 * | 2/2010 | Lo et al. | 345/88 |
| 7,916,158 | B2 * | 3/2011 | Aoki et al. | 345/690 |
| 2006/0028424 | A1 * | 2/2006 | Wu et al. | 345/102 |
| 2007/0132680 | A1 * | 6/2007 | Kagawa et al. | 345/84 |

FOREIGN PATENT DOCUMENTS

| | | |
|---|---|---|
| JP | 2001-209047 | 8/2001 |
| JP | 2002-318564 | 10/2002 |
| JP | 2007-003848 | 1/2007 |
| JP | 2007-010753 | 1/2007 |
| KR | 10-2004-0070542 | 8/2004 |

* cited by examiner

*Primary Examiner* — Bipin Shalwala
*Assistant Examiner* — Ryan A Lubit
(74) *Attorney, Agent, or Firm* — Staas & Halsey LLP

(57) ABSTRACT

A system and method for improving the saturation of a red-green-blue-white (RGBW) image signal, the system including: an image signal classification unit to classify a frame of an image signal into an image classification unit using an image classification parameter based on a luminance and a saturation of the frame; a backlight luminance controller to increase a backlight luminance with respect to the frame if the image classification unit thereof is a saturation improvement target; and a W sub-pixel controller to decrease a luminance of a W sub-pixel of the frame according to an amount of increase in the backlight luminance.

33 Claims, 8 Drawing Sheets

SYSTEM AND METHOD FOR ENHANCING SATURATION OF RGBW IMAGE SIGNAL

CROSS-REFERENCE TO RELATED APPLICATIONS

This application claims the benefit of Korean Application No. 2007-86231, filed Aug. 27, 2007 in the Korean Intellectual Property Office, the disclosure of which is incorporated herein by reference.

BACKGROUND OF THE INVENTION

1. Field of the Invention

Aspects of the present invention relate to a system and method of improving a saturation of a red-green-blue-white (RGBW) image signal, and more particularly, to a saturation improvement method and system that can increase a backlight luminance and decrease a luminance of W sub-pixels and thereby prevent a deterioration in a saturation of a pure color occurring when an RGB image signal is converted into an RGBW image signal.

2. Description of the Related Art

As compared to a red-green-blue (RGB) display, a red-green-blue-white (RGBW) display generally includes a white (W) sub-pixel, thereby improving the entire saturation of the display. In addition, the RGBW display requires a smaller number of integrated circuits (ICs) to drive a display. Therefore, the RGBW display can display image signals with low costs and high luminance.

However, due to the W sub-pixel added in the RGBW display, the saturation of pure colors included in the image signal may be deteriorated. Specifically, an absolute digital value of a pure color is the same as that of the RGB display. However, when the RGBW display includes a background, the luminance of the pure color may be relatively deteriorated because the luminance of the background is greater than that of the RGB display due to the W sub-pixel. Because of the relative luminance difference, the RGBW display has a relatively deteriorated saturation of the pure color in comparison to the RGB display. The pure color may have the highest saturation for a particular color tone.

For example, it is assumed that there exists a frame of an image signal having a letter in yellow and a background in grey. The yellow may be a pure color and be represented as a digital value (255, 255, 0). When representing the image signal using the RGBW display, the luminance of the background in grey is relatively greater than in the RGB display due to the W sub-pixel. Thus, the letter in yellow may look relatively darker. However, the luminance value of the background in grey is the same for both the RGB display and the RGBW display.

Although the luminance value of the grey background is the same, the background in the RGBW display may look relatively more luminous than in the RGB display due to the W sub-pixel. Accordingly, when the RGBW display is compared to the RGB display, the RGBW display may make the yellow letter appear relatively darker, resulting in a decreased saturation, although the yellow letter included in the grey background has the same absolute digital value in both the RGB display and the RGBW display. This problem may become more serious when a pure color having a higher saturation (such as yellow) is included in the entire frame.

In comparison to the conventional RGB display, the RGBW display has an advantage in that a manufacturing cost can be reduced due to a smaller number of ICs to drive the display. Moreover, due to the W sub-pixel, an image with high luminance may be readily represented and a number of backlights may be reduced. However, as described above, since the saturation of the pure color may deteriorate due to the W sub-pixel, there is a need for a method and system for improving the saturation.

SUMMARY OF THE INVENTION

Aspects of the present invention provide a method and system for improving a saturation of a red-green-blue-white (RGBW) image signal that increases a backlight luminance and decreases a luminance of W sub-pixels in an RGBW display, and thereby improves the saturation of a pure color.

Aspects of the present invention also provide a method and system for improving a saturation of an RGBW image signal that decreases a luminance value of a W sub-pixel and thereby maintains a luminance value of the entire frame.

Aspects of the present invention also provide a method and system for improving a saturation of an RGBW image signal that classifies each frame into an image classification unit using an image classification parameter, and thereby reduces an amount of calculations that is needed to improve the saturation.

Aspects of the present invention also provide a method and system for improving a saturation of an RGBW image signal that more accurately determines a frame to be a saturation improvement target using a luminance value of a pixel and saturation data that is generated based on a saturation histogram.

According to an aspect of the present invention, there is provided a system for improving a saturation of a RGBW image signal, the system including: an image signal classification unit to classify a frame of an image signal into an image classification unit using an image classification parameter based on a luminance and a saturation of the image signal; a backlight luminance controller to increase a backlight luminance with respect to the frame if the image classification unit thereof is a saturation improvement target; and a W sub-pixel controller to decrease a luminance of a W sub-pixel of the image signal according to an amount of increase in the backlight luminance.

The system may further include an image classification parameter calculator to convert pixel values of R, G, and B sub-pixels of the RGBW image signal into Hue Saturation Values (HSV), and to calculate the image classification parameter based on the HSV, wherein the image classification parameter includes an average luminance value and saturation data of each frame of the image signal, and the saturation data is generated based on a saturation histogram.

The saturation data may include accumulated additions of a number of pixels having a saturation value greater than an intermediate saturation value with respect to the saturation histogram of the frame, accumulated additions of a number of pixels having a saturation value less than or equal to the intermediate saturation value with respect to the saturation histogram, and a dynamic range that is determined based on a range of the saturation value with respect to the saturation histogram.

According to another aspect of the present invention, there is provided a method of improving a saturation of an RGBW image signal, the method including: classifying a frame of an image signal into an image classification unit using an image classification parameter based on a luminance and a saturation of the frame; increasing a backlight luminance with respect to the frame if the image classification unit thereof is a saturation improvement target; and decreasing a luminance of a W sub-pixel of the frame according to an amount of increase in the backlight luminance.

The method may further include converting pixel values of R, G, and B sub-pixels of the RGBW image signal into HSV to calculate the image classification parameter, wherein the image classification parameter includes an average luminance value and saturation data of each frame of the image signal, and the saturation data is generated based on a saturation histogram.

The image classification unit may be determined to be the saturation improvement target by considering an entire average luminance value of the frame and a shape of a saturation histogram.

The backlight luminance controller may increase the backlight luminance and thereby increase a luminance value of each of R, G, B, and W sub-pixels of a converted RGBW image signal.

According to yet another aspect of the present invention, there is provided a system for improving a saturation of an RGBW image signal, the system including: a backlight luminance controller to increase a backlight luminance with respect to a frame of an RGBW image signal; and a W sub-pixel controller to decrease a luminance of a W sub-pixel of the frame.

According to still another aspect of the present invention, there is provided a method of improving a saturation of an RGBW image signal, the method including: increasing a backlight luminance with respect to a frame of an RGBW image signal; and decreasing a luminance of a W sub-pixel of the frame.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
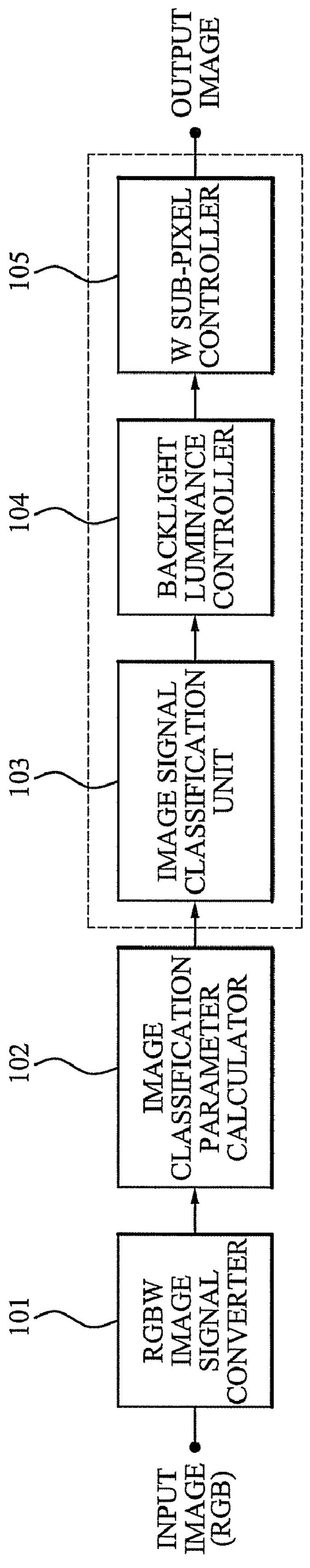
FIG. 1 is a block diagram illustrating a system for improving the saturation of an RGBW image signal according to an embodiment of the present invention.

Reference will now be made in detail to present embodiments of the present invention, examples of which are illustrated in the accompanying drawings, wherein like reference numerals refer to the like elements throughout. The embodiments are described below in order to explain aspects of the present invention by referring to the figures.

A method of improving the saturation of a red-green-blue-white (RGBW) image signal according to an embodiment of the present invention is performed by a system for improving the saturation of the RGBW image signal. FIG. 1 is a block diagram illustrating a system for improving the saturation of an RGBW image signal according to an embodiment of the present invention. Referring to FIG. 1, the system for improving the saturation of the RGBW image signal includes an RGBW image signal converter 101, an image classification parameter calculator 102, an image signal classification unit 103, a backlight luminance controller 104, and a W sub-pixel controller 105.

The RGBW image signal converter 101 converts an RGB image signal into the RGBW image signal. Compared to the RGB image signal, the RGBW image signal further includes a pixel value of a white (W) sub-pixel. As described above, an RGBW display may be more advantageous for displaying the high luminance of an image signal.

However, as described above, due to the luminance of the W sub-pixel that represents the background, the saturation of a pure color may deteriorate when the RGB image signal is converted into the RGBW image signal. Specifically, due to the luminance of the W sub-pixel included in the background, the background of the RGBW image signal may look relatively more luminous than the background of the RGB image signal.

Accordingly, the pure color included against the background of the RGBW image signal may look darker in an aspect of luminosity, and thus the saturation of the pure color may look relatively lower than in the RGB image signal.

For example, the RGBW image signal converter 101 may convert the RGB image signal into the RGBW image signal according to Equation 1:

$$R_{out}=R_{in}$$

$$G_{out}=G_{in}$$

$$B_{out}=B_{in}$$

$$W_{out}=\mathrm{Min}(R_{in},G_{in},B_{in}), \quad \text{[Equation 1]}$$

where $R_{in}$, $G_{in}$, and $B_{in}$ are respectively pixel values of sub-pixels with respect to the RGB image signal, $R_{out}$, $G_{out}$, $B_{out}$, and $W_{out}$ are respectively pixel values of sub-pixels with respect to the converted RGBW image signal, and, $W_{out}$ is a minimum value of $R_{in}$, $G_{in}$, and $B_{in}$.

Moreover, for example, the RGBW image signal converter 101 may convert the RGB image signal into a YUV image signal, and then convert the YUV image signal into the RGBW image signal. The converted YUV image signal may be converted into the RGBW image signal according to Equation 2:

$$R_{out}=Y_{in}-1.37V_{in}$$

$$G_{out}=Y_{in}-0.698V_{in}-0.336U_{in}$$

$$B_{out}=Y_{in}+1.732U_{in}$$

$$W_{out}=Y_{in} \quad \text{[Equation 2]}$$

where $Y_{in}$, $U_{in}$, and $V_{in}$ are respectively values that are obtained by converting the RGB signal into the YUV image signal, and $R_{out}$, $G_{out}$, $B_{out}$, and $W_{out}$ are respectively pixel values of sub-pixels of the RGBW image signal.

It is understood that the above Equation 1 and Equation 2 are only examples, and the RGBW image signal converter 101 may convert the RGB image signal into the RGBW image signal using another equation according to other aspects of the present invention.

In order to structurally convert the RGB image signal into the RGBW image signal, a rendering process between sub-pixels using an RGBW filter may be implemented. Specifically, the rendering process may be implemented because a sub-pixel structure of the RGB display that displays the RGB image signal differs from a sub-pixel structure of the RGBW display that displays the RGBW image signal. Thus, when a primary color set is different, a sub-pixel rendering process may be implemented.

The image classification parameter calculator 102 calculates an image classification parameter from the converted RGBW image signal using pixel values of R, G, and B sub-pixels. The image classification parameter may be determined based on the luminance and the saturation of the image signal. The image classification parameter is calculated in order to determine the saturation improvement target for each frame of the image signal.

The image classification parameter may include saturation data and the average luminance value of each frame of the image signal. Furthermore, the image classification parameter calculator 102 may convert pixel values of R, G, and B sub-pixels of the RGBW image signal into Hue Saturation Values (HSV) in order to calculate the average luminance value and the saturation data.

For example, the image classification parameter calculator 102 may calculate a luminance value of each pixel according to Equation 3:

$$V=\mathrm{Max}(R,G,B), \quad \text{[Equation 3]}$$

where V is the luminance value of the pixel. V is the maximum value among R, G, and B pixel values. Specifically, the luminance value of the pixel may be calculated as a maximum value of pixel values among R, G, and B sub-pixels.

Accordingly, the average luminance value of the image signal may be determined as a value that is obtained by averaging luminance values of pixels that are calculated according to the above Equation 3, with respect to the entire frame.

Moreover, the image classification parameter calculator 102 may calculate a saturation value of each pixel of the image signal according to Equation 4:

$$S=\frac{\mathrm{Max}(R,G,B)-\mathrm{Min}(R,G,B)}{V}, \quad \text{[Equation 4]}$$

where S is the saturation value of the pixel and V is the luminance value of the pixel that is calculated according to, for example, the above Equation 3.

Accordingly, the saturation histogram of the image signal may be determined by saturation values of the pixels of the image signal calculated according to the above Equation 4.

The image classification parameter calculator 102 may generate saturation data based on the saturation histogram. For example, the saturation data may include accumulated additions of a number of pixels corresponding to a saturation value greater than an intermediate saturation value with respect to the saturation histogram of the frame, accumulated additions of a number of pixels corresponding to a saturation value less than or equal to the intermediate saturation value with respect to the saturation histogram, and a dynamic range that is determined based on a range of the saturation value with respect to the saturation histogram.

The image signal classification unit 103 classifies each frame of the RGBW image signal into an image classification unit using the image classification parameter calculated by the image classification parameter calculator 102. The image classification unit may be determined based on whether the respective frame is the saturation improvement target by considering the entire average luminance value of the frame and a shape of the saturation histogram. The entire average luminance value is the average luminance value of an entire area of one frame. The saturation improvement target may include a frame of which the entire average luminance value exceeds a predetermined reference value, and a number of pixels corresponding to a saturation value greater than an intermediate saturation value with respect to the entire frame exceeds a predetermined threshold value.

Specifically, the saturation improvement target may include a frame that has a relatively greater average luminance value with respect to the entire frame and in which pixels with the relatively greater saturation are more distributed than pixels with the relatively lower saturation. According to an aspect of the present invention, each frame may be classified into an image classification unit using an image classification parameter, and thus the saturation may be improved with fewer calculations.

The backlight luminance controller 104 increases the backlight luminance with respect to the frame of which the image classification unit is the saturation improvement target. Accordingly, the backlight luminance controller 104 increases the luminance of the entire RGBW image signal. More specifically, the backlight luminance controller 104 may increase the backlight luminance and thereby increase a luminance value of each of R, G, B, and W sub-pixels of a converted RGBW image signal. Specifically, the luminance value of each of the R, G, B, and W sub-pixels increases in proportion to an increase in the backlight luminance.

As described above, as the backlight luminance increases, the luminance value of the entire frame increases. As the luminance of the entire frame increases, the luminance of the pure color included in the frame increases. Accordingly, the saturation of the pure color improves according to the increase in the luminance of the pure color.

Furthermore, as described above, the pure color may be a color that has the highest saturation in one color tone. Therefore, when any one of R, G, and B values of a pixel of the RGB image signal is 0, or when any two thereof is 0, the pixel corresponds to the pure color. For example, when (R, G, B) is (123, 0, 0) or (125, 45, 0), the image signal is pure colors. In this case, the pure color may have the maximum saturation in one color tone. Accordingly, the backlight luminance controller 104 increases the backlight luminance and thereby increases the saturation of the pure color in the RGBW image signal.

The W sub-pixel controller 105 decreases the luminance of a W sub-pixel of the image signal according to an amount of increase in the backlight luminance. More specifically, the W sub-pixel controller 105 decreases the luminance of the W sub-pixel by an amount equal to the amount of increase in the backlight luminance. Accordingly, the W sub-pixel controller 105 maintains the luminance value of the entire frame before and after the backlight luminance increases. Furthermore, by decreasing the luminance of the W sub-pixel according to an amount of increase in the backlight luminance, the W sub-pixel controller 105 eliminates a flickering phenomenon that occurs due to a luminance value difference between frames of the image signal.

As described above, according to an aspect of the present invention, a system for improving the saturation of an image signal increases the saturation of a pure color and maintains the luminance of the entire image by increasing the backlight luminance and decreasing the luminance of a W sub-pixel.

Figure 2:
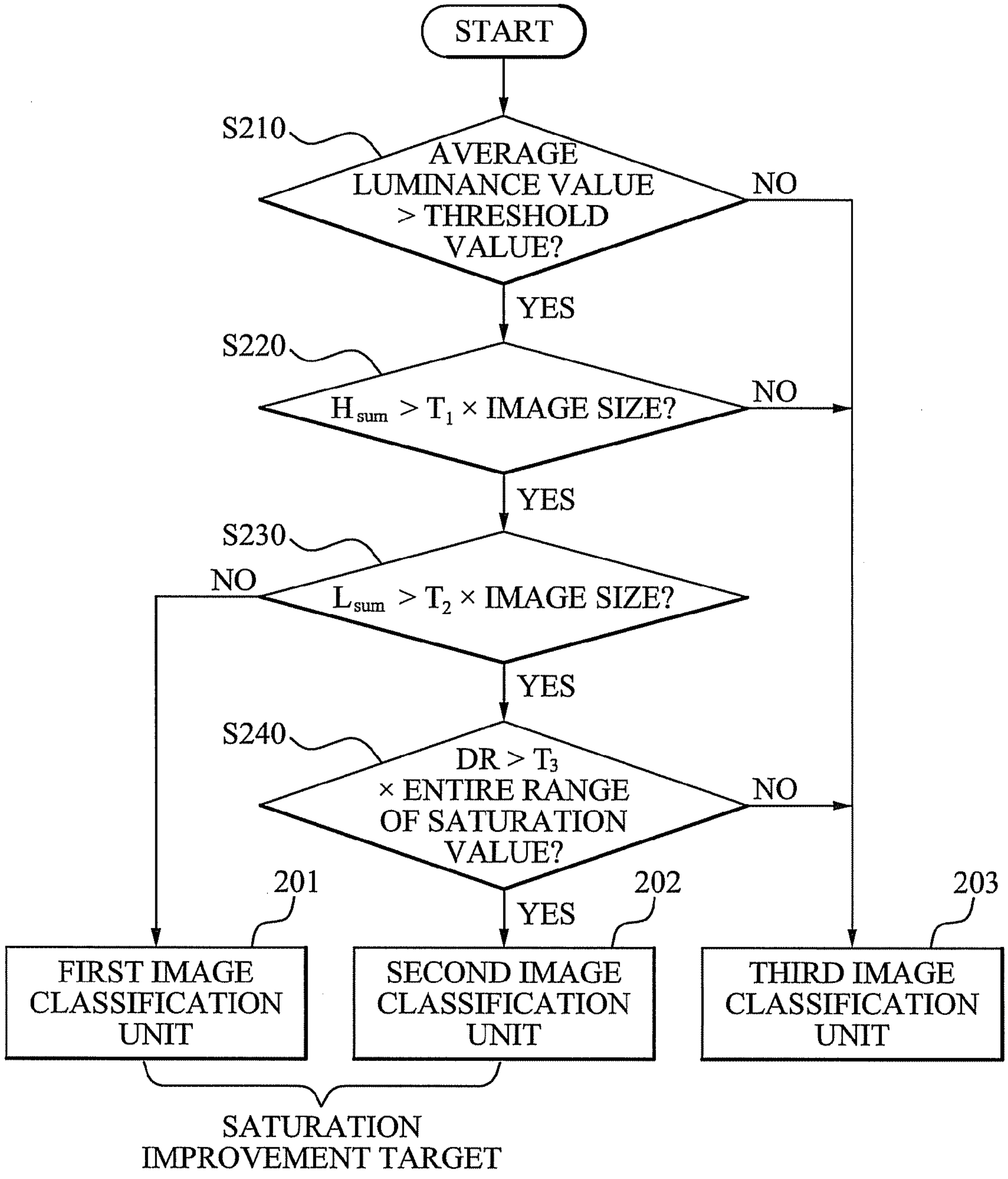
FIG. 2 illustrates a process of classifying each frame into an image classification unit using an image classification parameter according to an embodiment of the present invention.

FIG. 2 illustrates a process of classifying each frame into an image classification unit using an image classification parameter according to an embodiment of the present invention. Specifically, the image signal classification unit 103 may classify each frame into the image classification unit using the image classification parameter that is calculated by the image classification parameter calculator 102. As described above, the image classification parameter may include saturation data and a luminance value of a pixel.

According to an aspect of the present invention, the saturation data may include accumulated additions $H_{sum}$ of a number of pixels corresponding to a saturation value greater than an intermediate saturation value with respect to the saturation histogram of the frame, accumulated additions $L_{sum}$ of a number of pixels corresponding to a saturation value less than or equal to the intermediate saturation value with respect to the saturation histogram, and/or a dynamic range DR that is determined based on a range of the saturation value with respect to the saturation histogram.

Referring to FIGS. 1 and 2, the image signal classification unit 103 determines whether the average luminance value of pixels in a frame is greater than a predetermined threshold value in operation S210. When it is determined that the average luminance value is less than or equal to the threshold value (operation S210), the image signal classification unit 103 classifies a corresponding frame into a third image classification unit 203 (FIG. 2) that is not the saturation improvement target. Conversely, when it is determined that the average luminance value is greater than the threshold value (operation S210), the image signal classification unit 103 classifies the corresponding frame into a corresponding image classification unit by considering a saturation value of pixels that is included in a frame size.

When the image signal classification unit 103 determines $H_{sum}$ is less than or equal to a value that is obtained by multiplying the size of the entire frame and a predetermined ratio $T_1$ in operation S220, the corresponding frame is classified into the third image classification 203 that is not the saturation improvement target. Conversely, when it is determined that $H_{sum}$ is greater than the value that is obtained by multiplying the size of the entire frame and $T_1$ in operation S220, the image signal classification unit 103 determines whether $L_{sum}$ is greater than another value that is obtained by multiplying the size of the entire frame and a predetermined ratio $T_2$ in operation S230. As an example, $T_1$ and $T_2$ may be 0.25.

In this case, when it is determined that $L_{sum}$ is less than or equal to the other value that is obtained by multiplying the size of the entire frame and $T_2$ (operation S230), the image signal classification unit 103 classifies the corresponding frame into a first image classification unit 201. Conversely, when it is determined that $L_{sum}$ is greater than the other value that is obtained by multiplying the size of the entire frame and $T_2$ (operation S230), the image signal classification unit 103 determines whether the dynamic range DR is greater than still another value that is obtained by multiplying the entire range of saturation value and a predetermined ratio $T_3$ in operation S240.

In this case, when it is determined that the dynamic range DR is greater than the value that is obtained by multiplying the entire range of saturation value and $T_3$ (operation S240), the image signal classification unit 103 classifies the corresponding frame into a second classification unit 202. Conversely, when it is determined that the dynamic range DR is less than or equal to the results of multiplication between the entire range of saturation value and $T_3$ (operation S240), the image signal classification unit 103 classifies the corresponding frame into the third image classification unit 203. As an example, $T_3$ may be 0.9.

According to aspects of the present invention, the frame that is classified into the first image classification unit 201 or the second image classification unit 202 is determined as the saturation improvement target. The frame that is classified into the third image classification unit 203 is excluded from the saturation improvement target.

While FIG. 2 shows an example of a process of classifying a frame of an RGBW image signal into an image signal classification unit, it is understood that aspects of the present invention are not limited thereto, and a process of classifying an input image using an image classification parameter of FIG. 2 may be substituted with another structure in which the same aspects and advantages may be achieved.

Figure 3:
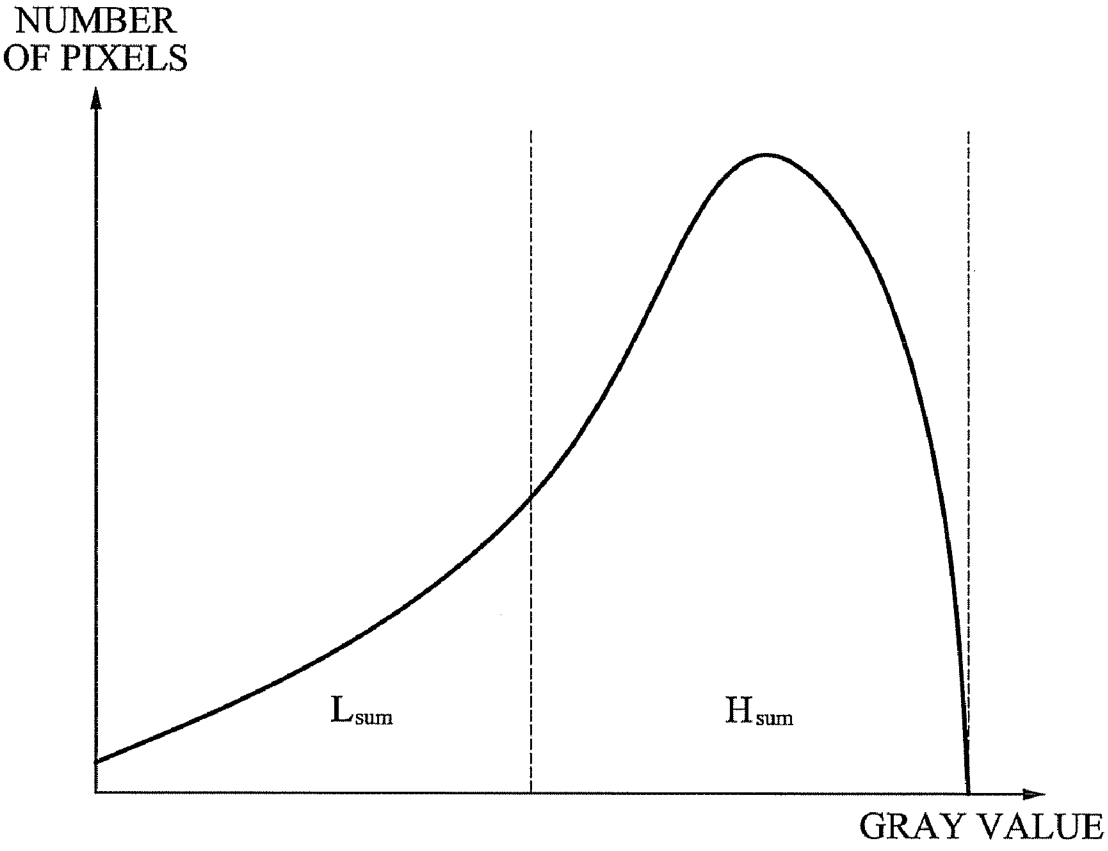
FIG. 3 is a graph illustrating an example of a saturation histogram that belongs to a first image classification unit according to an embodiment of the present invention.

FIG. 3 is a graph illustrating an example of a saturation histogram that belongs to a first image classification unit 201 according to an embodiment of the present invention. Referring to FIG. 3, the horizontal axis denotes a gray value and the vertical axis denotes a number of pixels corresponding to the gray value. For example, the gray value may be a digital saturation value.

As illustrated, the saturation histogram that belongs to the first image classification unit 201 shows that the accumulated additions $H_{sum}$ of the number of pixels corresponding to the saturation value greater than the intermediate saturation value are greater than the accumulated additions $L_{sum}$ of the number of pixels corresponding to the saturation value less than or equal to the intermediate saturation value.

Moreover, as shown in FIG. 3, a frame is classified into the first image classification unit 201 when the frame has $H_{sum}$ greater than the value that is obtained by multiplying the size of the entire frame and the ratio $T_1$, and $L_{sum}$ less than or equal to the value that is obtained by multiplying the size of the entire frame and the ratio $T_2$. Specifically, the frame that includes a relatively greater number of pixels with the greater saturation value than pixels with the smaller saturation value may be classified into the first image classification unit 201.

In this case, it may be assumed that the first image classification unit 201 corresponds to a frame in which the luminance value of the pixels (for example, an average luminance value of pixels in the frame) is greater than a predetermined reference value. For example, the reference value may be 128 for an 8-bit image.

Figure 4:
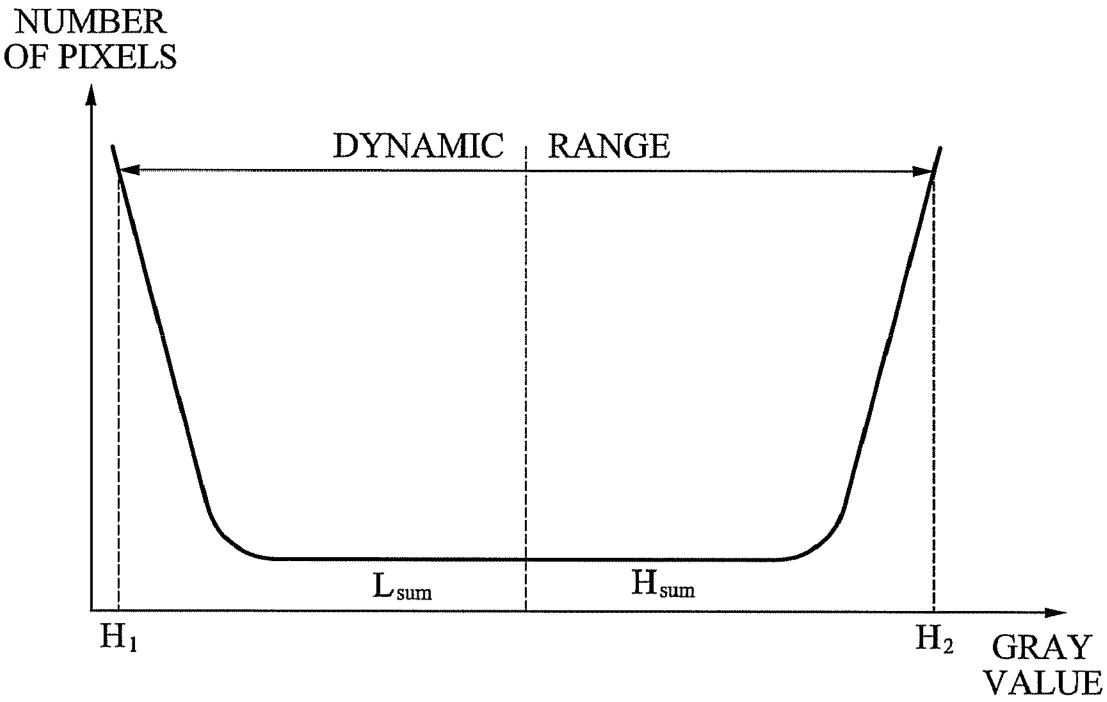
FIG. 4 is a graph illustrating an example of a saturation histogram that belongs to a second image classification unit according to an embodiment of the present invention.

FIG. 4 is a graph illustrating an example of a saturation histogram that belongs to a second image classification unit 202 according to an embodiment of the present invention. Referring to FIG. 4, the horizontal axis denotes a gray value and the vertical axis denotes a number of pixels corresponding to the gray value. For example, the gray value may be a digital saturation value.

As illustrated, the saturation histogram that belongs to the second image classification unit 202 shows that the accumulated additions $H_{sum}$ of the number of pixels corresponding to the saturation value greater than the intermediate saturation are the same as the accumulated additions $L_{sum}$ of the number of pixels corresponding to the saturation value less than or equal to the intermediate saturation value.

Moreover, as shown in FIG. 4, a frame is classified into the second image classification unit 202 when the frame has $H_{sum}$ greater than the value that is obtained by multiplying the size of the entire frame and the ratio $T_1$, and $L_{sum}$ greater than the value that is obtained by multiplying the size of the entire frame and the ratio $T_2$.

In addition, in the case of the frame that has a dynamic range DR greater than the value that is obtained by multiplying the entire range of saturation value and the ratio $T_3$, the frame may be classified into the second image classification unit 202. The dynamic range is determined based on the range of saturation values with respect to the saturation histogram. As shown in FIG. 4, the dynamic range may be within the range of gray values $H_1$ to $H_2$. For example, the saturation value range of $H_1$ to $H_2$ may exclude the saturation value range that belongs to the top 1% and the bottom 1%.

Specifically, referring to the shape of the saturation histogram, in the frame classified into the second image classification unit 202, pixels having the relatively greater saturation and pixels having the relatively lower saturation are equally (or almost equally) distributed. However, the dynamic range may be greater than the value that is obtained by multiplying the entire range of saturation value and the ratio $T_3$. In this case, when the luminance value of the pixels of the frame (for example, an average luminance value of the pixels) is greater than a predetermined reference value, it may be assumed the frame will be classified into the second image classification unit 202. For example, the reference value may be 128 for an 8-bit image.

Figure 5:
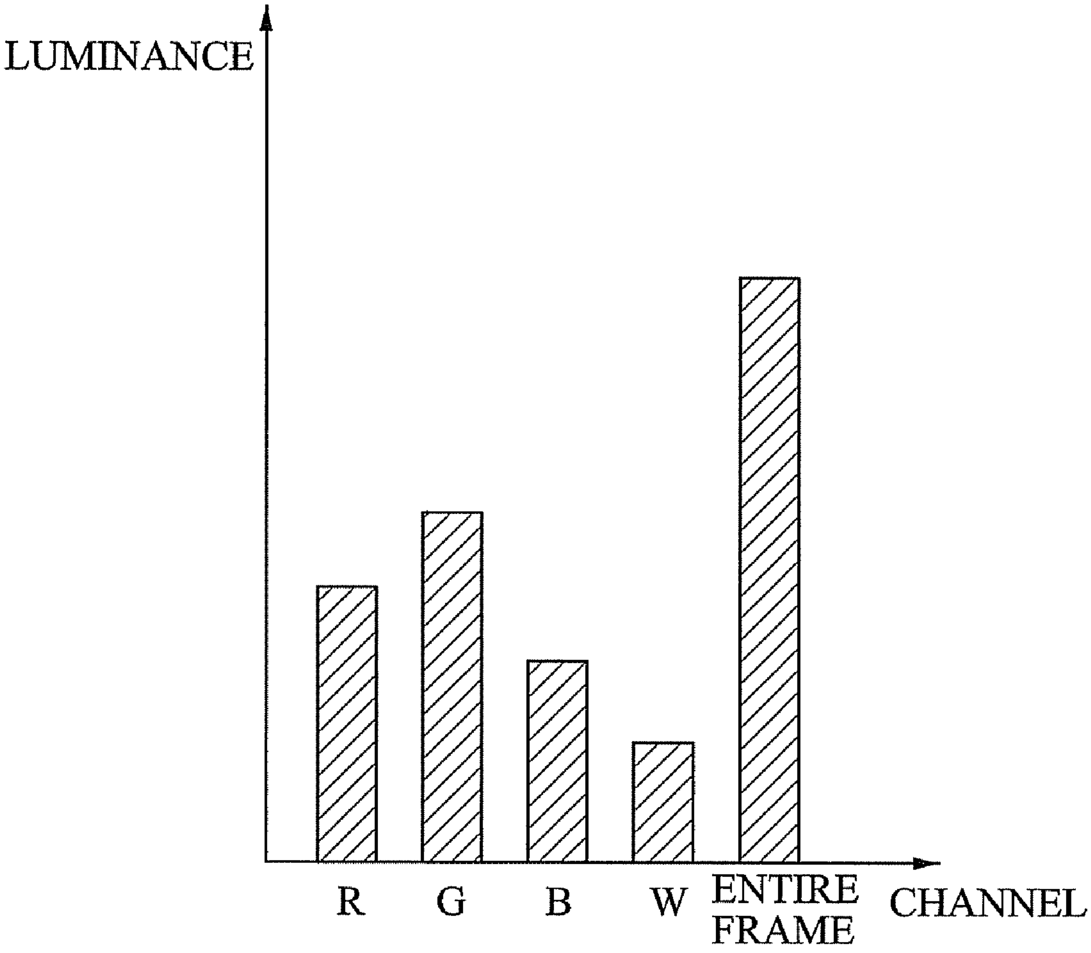
FIG. 5 is a graph illustrating the luminance of an RGBW image signal that is converted from an RGB image signal for each channel according to an embodiment of the present invention.

FIG. 5 is a graph illustrating the luminance of an RGBW image signal that is converted from an RGB image signal for each channel according to an embodiment of the present invention. Referring to FIG. 5, the horizontal axis denotes each channel of the RGBW image signal (i.e., each sub-pixel of the RGBW image signal) and the vertical axis denotes the luminance value for each channel.

As described above with FIG. 1, when compared to the RGB image signal, the RGBW image signal further includes a W sub-pixel. Due to the W sub-pixel, the RGBW image signal generally has a greater luminance than the RGB image signal. In addition, due to the W sub-pixel, the background of the RGBW image signal appears relatively more luminous than the background of the RGB image signal.

Accordingly, although a pure color included in each image has the same absolute luminance digital value, the pure color in the RGBW image appears darker due to the relatively more luminous background. Accordingly, the pure color included in the RGBW image signal may appear to have a relatively lower saturation than the pure color in the RGB image signal.

For example, when an image signal includes a red apple against a gray background, the gray background of the RGBW image signal may appear more luminous than the gray background of the RGB image signal due to the W sub-pixel. Therefore, when the red apple is represented using the RGBW image signal, the red apple may appear darker in the RGBW image than in the RGB image signal in an aspect of luminosity. Thus, the apple may appear to have a lower saturation than the apple represented using the RGB image signal.

Figure 6:
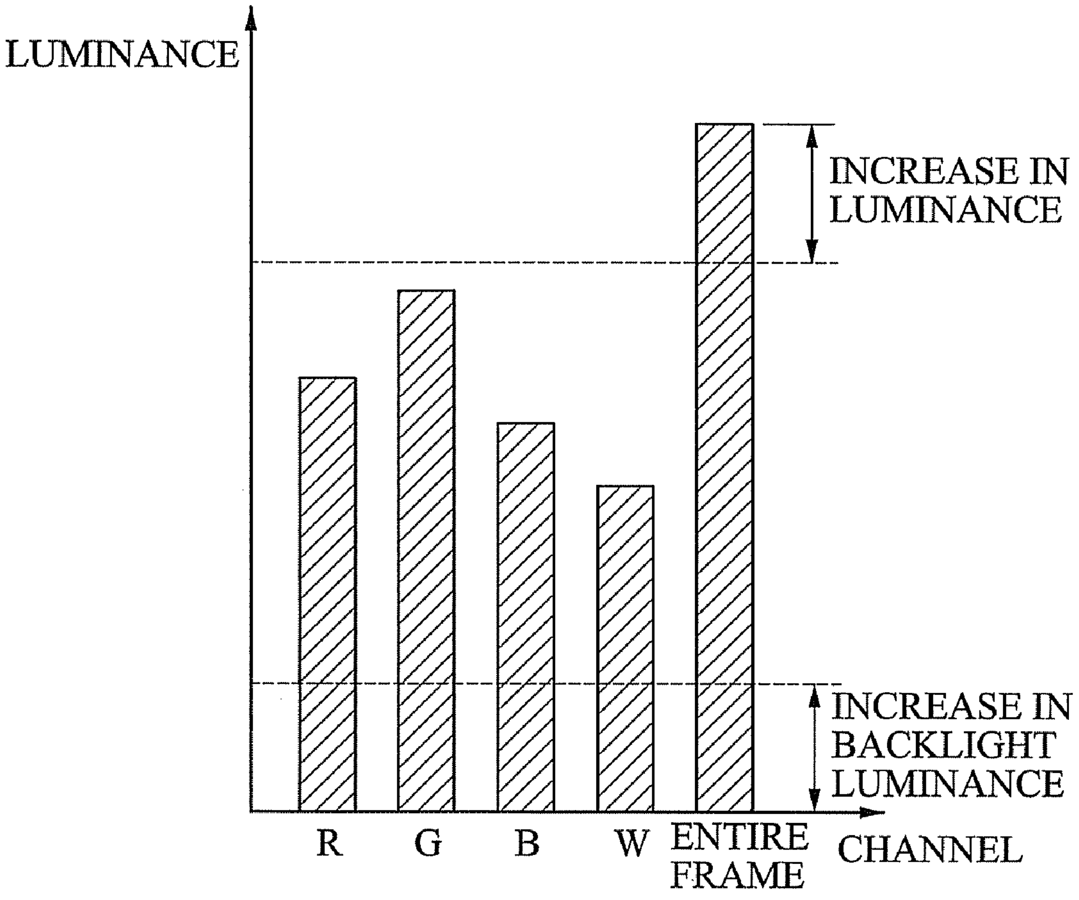
FIG. 6 is a graph illustrating the luminance of an RGBW image signal for each channel when increasing the backlight luminance according to an embodiment of the present invention.

FIG. 6 is a graph illustrating the luminance of an RGBW image signal for each channel when increasing the backlight luminance according to an embodiment of the present invention. Referring to FIG. 6, when increasing the backlight luminance, the luminance of sub-pixels, (i.e., channels) of the RGBW image signal may be increased. An amount of increase of the luminance of the sub-pixels is proportional to an amount of increase in the backlight luminance. While the luminance of each sub-pixel increases, the luminance of a pure color indicated by the sub-pixel also increases. Therefore, the saturation of the pure color may be improved in proportion to the luminance of the pure color. However, the luminance of the W sub-pixel that is included in the background around the pure color also increases, and thus the saturation of the pure color may not be greatly improved in an aspect of luminosity.

As shown in FIG. 6, the luminance value of the entire frame increases as the luminance of sub-pixels of the frame increases. As described above, since not every frame is necessarily classified as the saturation improvement target, flickering may occur due to a difference in a luminance value between the frame of which the backlight luminance is increased and another frame in which the backlight luminance is not applied. Accordingly, there is a need to decrease the luminance of the W sub-pixel.

Figure 7:
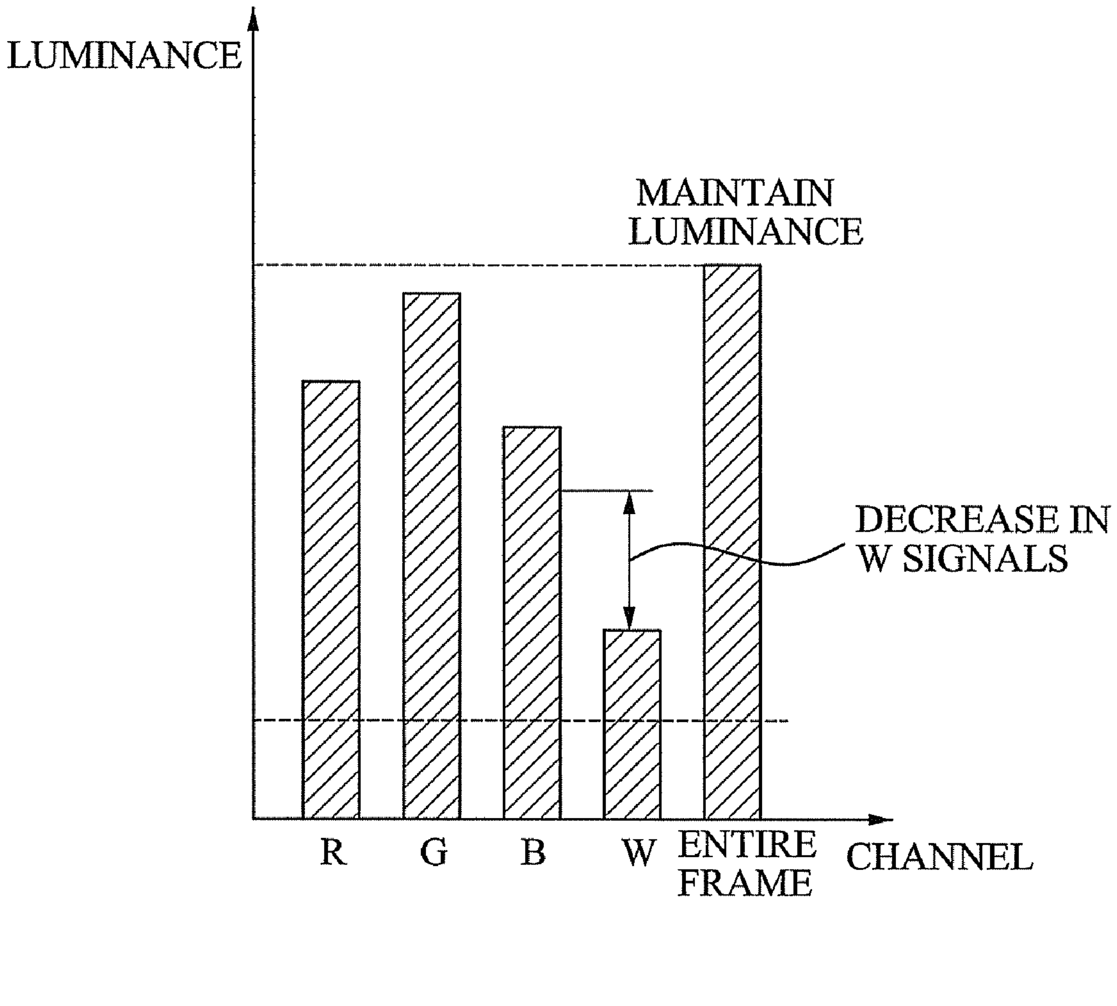
FIG. 7 is a graph illustrating the luminance of an RGBW image signal for each channel when decreasing the luminance of a W sub-pixel according to an embodiment of the present invention.

FIG. 7 is a graph illustrating the luminance of an RGBW image signal for each channel when decreasing the luminance of a W sub-pixel according to an embodiment of the present invention. As described above with reference to FIG. 1, a W sub-pixel controller 105 decreases the luminance of the W sub-pixel according to an amount of increase in the backlight luminance. In this case, the W sub-pixel controller decreases the luminance of the W sub-pixel so that a luminance value of the entire frame is the same as a luminance value before the backlight luminance was increased (as illustrated in FIG. 5).

When the luminance of the W sub-pixel is decreased, the luminance of R, G, and B sub-pixels, but not the W sub pixel, is maintained as is after the backlight luminance is increased (as illustrated in FIG. 6). That is, the luminance values of the R, G, and B sub-pixels that are respectively increased according to the increase in the backlight luminance is maintained regardless of the decrease in the luminance of the W sub-pixel.

In the case of a pure color, since the luminance value of the W sub-pixel is nearly 0, there is no great change in the luminance of the pure color when the luminance of the W sub-pixel is decreased. However, since the luminance value of the W sub-pixel is decreased, the background around the pure color causes the pure color to appear more luminous. Therefore, in an aspect of luminosity, the saturation of the pure color appears relatively improved in comparison when increasing the backlight luminance.

As described above, when the backlight luminance increases, the saturation of the pure color also increases. In addition, as the luminance of the W sub-pixel decreases, the luminance value of the entire frame changes back to the luminance value of the frame before the backlight luminance was increased, which resolves the flickering problem between frames.

Figure 8:
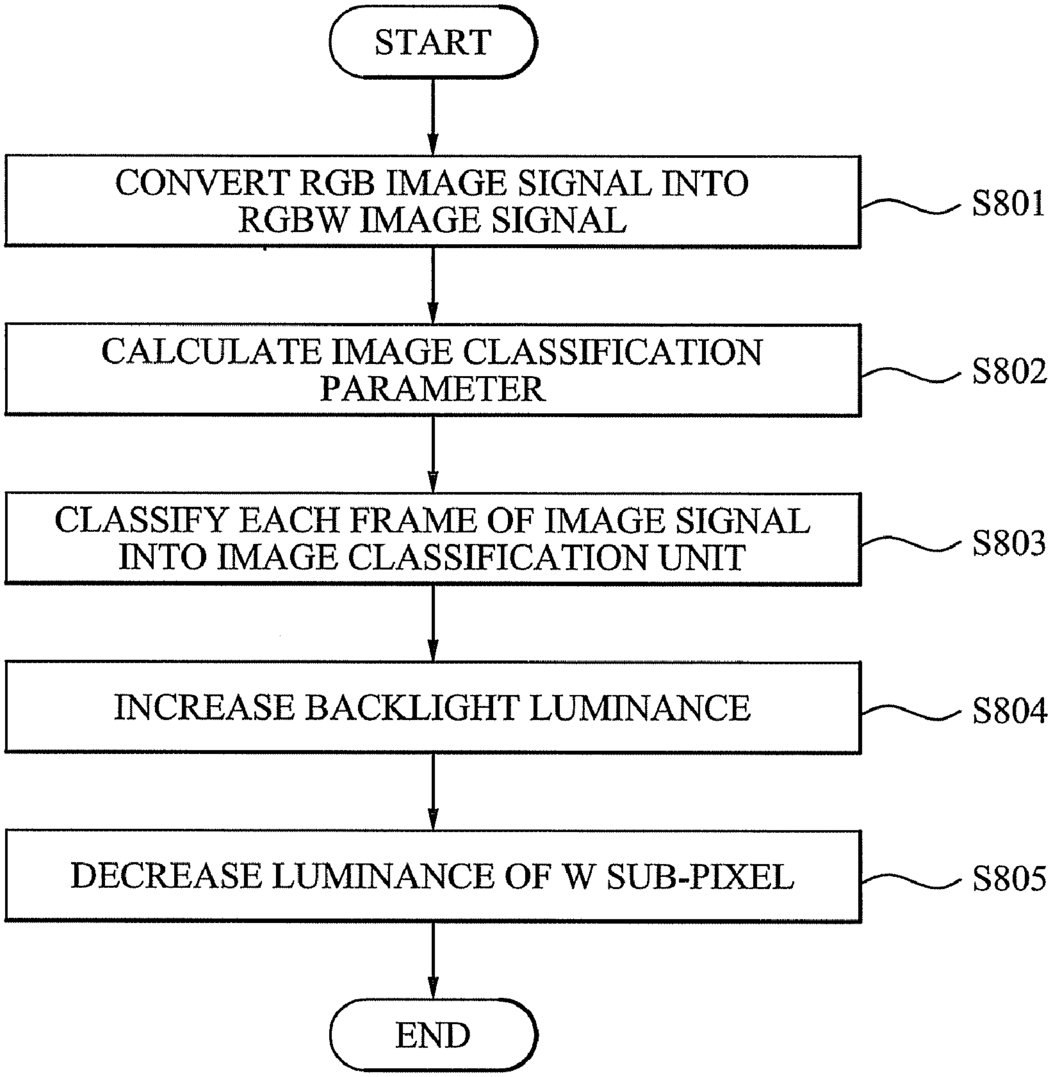
FIG. 8 is a flowchart illustrating a method of improving the saturation of an RGBW image signal according to an embodiment of the present invention.

FIG. 8 is a flowchart illustrating a method of improving the saturation of an RGBW image signal according to an embodiment of the present invention. Referring to FIG. 8, the method of improving the saturation of the RGBW image signal converts an RGB image signal into the RGBW image signal in operation S801. Specifically, the RGB image signal may be converted into the RGBW image signal according to Equation 5 (same as Equation 1 described with reference to FIG. 1):

$$R_{out}=R_{in}$$

$$G_{out}=G_{in}$$

$$B_{out}=B_{in}$$

$$W_{out}=\text{Min}(R_{in},G_{in},B_{in}), \quad \text{[Equation 5]}$$

where $R_{in}$, $G_{in}$, and $B_{in}$ are respectively pixel values of sub-pixels with respect to the RGB image signal, $R_{out}$, $G_{out}$, $B_{out}$, and $W_{out}$ are respectively pixel values of sub-pixels with respect to the converted RGBW image signal, and, $W_{out}$ is a minimum value of $R_{in}$, $G_{in}$, and $B_{in}$.

Moreover, the method may convert the RGB image signal into a YUV image signal, and convert the converted YUV image signal again into the RGBW image signal in operation S801. The converted YUV image signal may be converted into the RGBW image signal according to Equation 6 (same as Equation 2 described with reference to FIG. 1):

$$R_{out}=Y_{in}-1.37V_{in}$$

$$G_{out}=Y_{in}-0.698V_{in}-0.336U_{in}$$

$$B_{out}=Y_{in}+1.732U_{in}$$

$$W_{out}=Y_{in}, \quad \text{[Equation 6]}$$

where $Y_{in}$, $U_{in}$, and $V_{in}$ are respectively values that are obtained by converting the RGB signal into the YUV image signal, and $R_{out}$, $G_{out}$, $B_{out}$, and $W_{out}$ are respectively pixel values of sub-pixels of the RGBW image signal.

In operation S802, an image classification parameter is calculated from the converted RGBW image using pixel values of the R, G, and B sub-pixels. Specifically, the pixel values of the R, G, and B sub-pixels may be converted into Hue Saturation Values (HSV) in order to calculate the image classification parameter. Furthermore, the image classification parameter may include an average luminance value and saturation data for each frame of the image signal. The saturation data may be generated based on a saturation histogram.

In this case, the average luminance value of the image signal may be determined by averaging pixel luminance values, whereby each of the pixel luminance values is calculated using R, G, and B sub-pixels of the image signal according to Equation 7 (same as Equation 3 described with reference to FIG. 1):

$$V=\text{Max}(R,G,B), \quad \text{[Equation 7]}$$

where V is the luminance value of the pixel.

The saturation histogram of the image signal is determined based on a saturation value of a pixel that is calculated, with respect to the image signal having RGB color coordinates, according to Equation 8 (same as Equation 4 described with reference to FIG. 1):

$$S=\frac{\text{Max}(R,G,B)-\text{Min}(R,G,B)}{V}, \quad \text{[Equation 8]}$$

where S is the saturation value of the pixel and V is a luminance value of the pixel.

According to an aspect of the present invention, the saturation data may include accumulated additions of a number of pixels corresponding to a saturation value greater than an intermediate saturation value with respect to the saturation histogram of the frame, accumulated additions of a number of pixels corresponding to a saturation value less than or equal to the intermediate saturation value with respect to the saturation histogram, and/or a dynamic range that is determined based on a range of the saturation value with respect to the saturation histogram.

In operation S803, each frame of the image signal is classified into an image classification unit using the image classification parameter based on the saturation and the luminance of the image signal. A frame may be classified as the saturation improvement target according to the entire average luminance value of the frame and a shape of the saturation histogram.

According to an aspect of the present invention, the saturation improvement target may include a frame of which the entire average luminance value exceeds a predetermined reference value, and/or a number of pixels corresponding to a saturation value greater than an intermediate saturation value with respect to the entire frame exceeds a predetermined threshold value.

In operation S804, the backlight luminance is increased with respect to a frame of which the image classification unit is the saturation improvement target. Specifically, when the backlight luminance is increased, a luminance value of each of R, G, B, and W sub-pixels of a converted RGBW image signal is also increased in the respective frame.

In operation S805, the luminance of a W sub-pixel of the image signal is decreased according to an amount of increase in the backlight luminance. According to an aspect of the present invention, the luminance of the W sub-pixel is decreased by an amount equal to an amount of increase in the backlight luminance so that the entire luminance value of the frame is equal before and after the backlight luminance increases.

Descriptions made with reference to FIGS. 1 through 7 will be applicable to FIG. 8 and thus will be omitted here.

The method of improving the saturation of the RGBW image signal according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to aspects of the present invention, there is provided a method and system for improving a saturation of an RGBW image signal that increases a backlight luminance and decreases a luminance of W sub-pixels in an RGBW display, and thereby improves the saturation of a pure color.

Also, according to aspects of the present invention, there is provided a method and system for improving a saturation of an RGBW image signal that decreases a luminance value of a W sub-pixel, and thereby maintains a luminance value of the entire frame.

Furthermore, according to aspects of the present invention, there is provided a method and system for improving a saturation of an RGBW image signal that classifies each frame into an image classification unit using an image classification parameter, and thereby reduces an amount of calculations that is needed to improve the saturation.

Moreover, according to aspects of the present invention, there is provided a method and system for improving a saturation of an RGBW image signal that more accurately determines a frame to be a saturation improvement target using a luminance value of a pixel and saturation data that is generated based on a saturation histogram.

Although a few embodiments of the present invention have been shown and described, it would be appreciated by those skilled in the art that changes may be made to these embodiments without departing from the principles and spirit of the invention, the scope of which is defined in the claims and their equivalents.

What is claimed is:

1. A system for improving a saturation of a red-green-blue-white (RGBW) image signal, the system comprising:

an image signal classifier to determine whether a frame of an RGBW image signal is a saturation improvement target using an image classification parameter based on a luminance and a saturation of the frame, the image signal classifier classifying each frame of the RGBW image signal into an image classification unit using an image classification parameter of each respective frame;

a backlight luminance controller to increase a backlight luminance with respect to the frame when the image signal classifier determines the frame to be the saturation improvement target; and a W sub-pixel controller to decrease a luminance of a W sub-pixel of the frame by an amount equal to an amount of increase in the backlight luminance, wherein the image signal classifier calculates an entire average luminance value of the frame, calculates a number of pixels of the frame having a saturation value greater than an intermediate saturation value with respect to the entire frame, and determines the image classification unit for the frame to be the saturation improvement target when:

both the calculated entire average luminance value of the frame exceeds a predetermined reference value; and the calculated number of pixels of the frame having a saturation value greater than an intermediate saturation value with respect to the entire frame exceeds a predetermined threshold value.

2. The system as claimed in claim 1, wherein the W sub-pixel controller decreases the luminance of the W sub-pixel of the frame equal to the amount of increase in the backlight luminance so that the luminance of the frame is equal before and after the backlight luminance controller increases the backlight luminance.

3. The system as claimed in claim 1, further comprising:

an RGBW image signal converter to convert a red-green-blue (RGB) image signal into the RBGW image signal.

4. The system as claimed in claim 3, wherein the RGBW image signal converter converts the RGB image signal into the RGBW image signal according to:

$$R_{out}=R_{in}$$

$$G_{out}=G_{in}$$

$$B_{out}=B_{in}$$

$$W_{out}=\mathrm{Min}(R_{in},G_{in},B_{in}),$$

where $R_{in}$, $G_{in}$, and $B_{in}$ are respectively pixel values of sub-pixels of the RGB image signal, $R_{out}$, $G_{out}$, $B_{out}$, and $W_{out}$ are respectively pixel values of sub-pixels of the converted RGBW image signal, and, $W_{out}$ is a minimum value among $R_{in}$, $G_{in}$, and $B_{in}$.

5. The system as claimed in claim 3, wherein the RGBW image signal converter converts the RGB image signal into a YUV image signal, and converts the converted YUV image signal into the RGBW image signal.

6. The system as claimed in claim 1, further comprising:

an image classification parameter calculator to convert pixel values of R, G, and B sub-pixels of the RGBW image signal into Hue Saturation Values (HSV), and to calculate the image classification parameter of the frame based on the HSV, wherein the image classification parameter includes the average luminance value and saturation data of the frame, and the saturation data is generated based on a saturation histogram.

7. The system as claimed in claim 6, wherein:

the image classification parameter calculator calculates the average luminance value of the frame by averaging pixel luminance values of the frame; and the image classification parameter calculator calculates each of the pixel luminance values using the R, G, and B sub-pixels of the frame according to:

$$V=\mathrm{Max}(R,G,B),$$

where V is the luminance value of the respective pixel.

8. The system as claimed in claim 6, wherein:

the image classification parameter calculator determines the saturation histogram of the frame based on a saturation value of each pixel of the frame; and the image classification parameter calculator calculates the saturation value of each pixel according to:

$$S=\frac{\mathrm{Max}(R,G,B)-\mathrm{Min}(R,G,B)}{V},$$

where S is the saturation value of the respective pixel and V is a luminance value of the respective pixel.

9. The system as claimed in claim 6, wherein the saturation data comprises accumulated additions of a number of pixels having a saturation value greater than an intermediate saturation value with respect to the saturation histogram of the frame, accumulated additions of a number of pixels having a saturation value less than or equal to the intermediate saturation value with respect to the saturation histogram, and/or a dynamic range that is determined based on a range of saturation values with respect to the saturation histogram.

10. The system as claimed in claim 1, wherein the image signal classifier determines the image classification unit for the frame by considering the entire average luminance value of the frame and a shape of a saturation histogram.

11. The system as claimed in claim 1, wherein the backlight luminance controller increases the backlight luminance and thereby increases a luminance value of each of R, G, B, and W sub-pixels of the frame of the RGBW image signal.

12. The system as claimed in claim 1, wherein the W sub-pixel controller decreases the luminance by decreasing a luminance value of the W sub-pixel according to an amount of increase in the backlight luminance to maintain a same entire luminance value of the frame before and after the backlight luminance controller increases the backlight luminance of the frame.

13. A method of improving a saturation of an RGBW image signal, the method comprising:

determining whether a frame of an RGW image signal is a saturation improvement target using an image classification parameter based on a luminance and a saturation of the frame, the determining of whether the frame is the saturation improvement target comprising classifying each frame of the RGBW image signal into an image classification unit using an image classification parameter of each respective frame;

increasing a backlight luminance with respect to the frame when the frame is determined to be the saturation improvement target; and decreasing a luminance of a W sub-pixel of the frame by an amount equal to an amount of increase in the backlight luminance, wherein the classifying of each frame further comprises calculating an entire average luminance value of the frame, calculating a number of pixels of the frame having a saturation value greater than an intermediate saturation value with respect to the entire frame, and determining the image classification unit for the frame to be the saturation improvement target when:

both the calculated entire average luminance value of the frame exceeds a predetermined reference value; and the calculated number of pixels of the frame having a saturation value greater than an intermediate saturation value with respect to the entire frame exceeds a predetermined threshold value.

14. The method as claimed in claim 13, wherein the decreasing of the luminance of the W sub-pixel comprises decreasing the luminance of the W sub-pixel of the frame equal to the amount of increase in the backlight luminance so that the luminance of the frame is equal before and after the backlight luminance is increased.

15. The method as claimed in claim 13, further comprising:

converting an RGB image signal into the RBGW image signal.

16. The method as claimed in claim 15, wherein the converting of the RGB image signal comprises converting the RGB image signal into the RGBW image signal according to:

$$R_{out}=R_{in}$$

$$G_{out}=G_{in}$$

$$B_{out}=B_{in}$$

$$W_{out}=\mathrm{Min}(R_{in},G_{in},B_{in}),$$

where $R_{in}$, $G_{in}$, and $B_{in}$ are respectively pixel values of sub-pixels of the RGB image signal, $R_{out}$, $G_{out}$, $B_{out}$, and $W_{out}$ are respectively pixel values of sub-pixels of the converted RGBW image signal, and, $W_{out}$ is a minimum value among $R_{in}$, $G_{in}$, and $B_{in}$.

17. The method as claimed in claim 15, wherein the converting of the RGB image signal comprises converting the RGB image signal into a YUV image signal, and converting the converted YUV image signal into the RGBW image signal.

18. The method as claimed in claim 13, further comprising:

converting pixel values of R, G, and B sub-pixels of the RGBW image signal into Hue Saturation Values (HSV); and calculating the image classification parameter of the frame based on the HSV, wherein the image classification parameter includes an average luminance value and saturation data of the frame, and the saturation data is generated based on a saturation histogram.

19. The method as claimed in claim 18, wherein the calculating of the image classification parameter comprises:

calculating the average luminance value of the frame by averaging pixel luminance values of the frame; and calculating each of the pixel luminance values using the R, G, and B sub-pixels of the frame according to:

$$V=\mathrm{Max}(R,G,B),$$

where V is the luminance value of the respective pixel.

20. The method as claimed in claim 18, wherein the calculating of the image classification parameter comprises:

determining the saturation histogram of the frame based on a saturation value of each pixel of the frame, the saturation value of each pixel calculated according to:

$$S=\frac{\mathrm{Max}(R,G,B)-\mathrm{Min}(R,G,B)}{V},$$

where S is the saturation value of the respective pixel and V is a luminance value of the respective pixel.

21. The method as claimed in claim 18, wherein the saturation data comprises accumulated additions of a number of pixels having a saturation value greater than an intermediate saturation value with respect to the saturation histogram of the frame, accumulated additions of a number of pixels having a saturation value less than or equal to the intermediate saturation value with respect to the saturation histogram, and/or a dynamic range that is determined based on a range of the saturation value with respect to the saturation histogram.

22. The method as claimed in claim 13, wherein the classifying of each frame comprises determining the image classification unit for the frame by considering the entire average luminance value of the frame and a shape of a saturation histogram.

23. The method as claimed in claim 13, wherein the increasing of the backlight luminance comprises increasing the backlight luminance and thereby increasing a luminance value of each of R, G, B, and W sub-pixels of the frame of the RGBW image signal.

24. The method as claimed in claim 13, wherein the decreasing of the luminance of the W sub-pixel comprises decreasing a luminance value of the W sub-pixel according to an amount of increase in the backlight luminance to maintain a same entire luminance value of the frame before and after the increasing of the backlight luminance.

25. A non-transitory computer readable recording medium storing a program for implementing the method as claimed in claim 13 and executed by a computer.

26. A system for improving a saturation of an RGBW image signal, the system comprising:

an image signal classifier to calculate an entire average luminance value of the frame, calculate a number of pixels of the frame having a saturation value greater than an intermediate saturation value with respect to the entire frame, and determine whether a frame of the RGBW image signal is a saturation improvement target when:

both the calculated entire average luminance value of the frame exceeds a predetermined reference value; and the calculated number of pixels of the frame having a saturation value greater than an intermediate saturation value with respect to the entire frame exceeds a predetermined threshold value;

a backlight luminance controller to increase a backlight luminance with respect to the frame; and a W sub-pixel controller to decrease a luminance of a W sub-pixel of the frame by an amount equal to an amount of increase in the backlight luminance.

27. The system as claimed in claim 26, wherein the W sub-pixel controller decreases the luminance of the W sub-pixel of the frame equal to the amount of increase in the backlight luminance so that an entire luminance of the frame is a same luminance before and after the backlight luminance controller increases the backlight luminance.

28. The system as claimed in claim 26, further comprising an image signal classifier to determine whether the frame is a saturation improvement target using an image classification parameter based on a luminance and a saturation of the frame, wherein the backlight luminance controller increases the backlight luminance only if the image signal classifier determines the frame to be the saturation improvement target, and the W sub-pixel controller decreases the luminance of the W sub-pixel only if the image signal classifier determines the frame to be the saturation improvement target.

29. The system as claimed in claim 26, wherein the W sub-pixel controller maintains an entire luminance of the frame to be a same luminance before and after the backlight luminance controller increases the backlight luminance.

30. The system as claimed in claim 27, wherein the W sub-pixel controller increases a saturation of a pure color of the frame.

31. A method of improving a saturation of an RGBW image signal, the method comprising:

calculating an entire average luminance value of the frame;

calculating a number of pixels of the frame having a saturation value greater than an intermediate saturation value with respect to the entire frame;

determining whether a frame of the RGBW image signal is a saturation improvement target when:

both the calculated entire average luminance value of the frame exceeds a predetermined reference value; and the calculated number of pixels of the frame having a saturation value greater than an intermediate saturation value with respect to the entire frame exceeds a predetermined threshold value;

increasing a backlight luminance with respect to the frame; and decreasing a luminance of a W sub-pixel of the frame by an amount equal to an amount of increase in the backlight luminance.

32. The method as claimed in claim 31, wherein the decreasing of the luminance of the W sub-pixel comprises maintaining an entire luminance of the frame to be a same luminance before and after the backlight luminance controller increases the backlight luminance.

33. The method as claimed in claim 32, wherein the decreasing of the luminance of the W sub-pixel further comprises increasing a saturation of a pure color of the frame.

* * * * *

UNITED STATES PATENT AND TRADEMARK OFFICE

CERTIFICATE OF CORRECTION

PATENT NO. : 8,384,653 B2
APPLICATION NO. : 12/029016
DATED : February 26, 2013
INVENTOR(S) : Yun-Tae Kim et al.

It is certified that error appears in the above-identified patent and that said Letters Patent is hereby corrected as shown below:

In the claims

Column 13, Line 57, In Claim 3, delete "RBGW" and insert -- RGBW --, therefor.

Column 15, Line 3, In Claim 13, delete "RGW" and insert -- RGBW --, therefor.

Column 15, Line 37, In Claim 15, delete "RBGW" and insert -- RGBW --, therefor.

Signed and Sealed this
Fifteenth Day of October, 2013

Teresa Stanek Rea
*Deputy Director of the United States Patent and Trademark Office*